June 1, 1937.  J. N. KIEP  2,082,581

HYDRAULIC POWER TRANSMISSION SYSTEM

Filed Oct. 15, 1935

Patented June 1, 1937

2,082,581

UNITED STATES PATENT OFFICE 2,082,581

HYDRAULIC POWER TRANSMISSION SYSTEM

Johann Nikolaus Kiep, Altona-Hochkamp, Germany, assignor to Hydraulic Coupling Patents Limited, London, England, a company of Great Britain Application October 15, 1935, Serial No. 45,075
In Great Britain October 18, 1934

15 Claims. (Cl. 192—57)

The present invention relates to hydraulic power transmission systems of the kind embodying a hydraulic coupling of the kinetic type (that is to say a Föttinger power transmitter having a vaned impeller and a vaned runner element but no vaned reaction member), arranged to transmit power from a driving engine to a driven machine, such for example as the change-speed gearing of an automobile. It is especially, but not exclusively, adapted for constructions in which the driven machine, or an outer bearing supporting the input shaft of the driven machine, is rigidly connected to the driving engine by a bell-housing enclosing the hydraulic coupling or by a sub-frame.

A common arrangement is to attach the driving part of the coupling, comprising an impeller and a casing fixed to the impeller and shrouding the back of the runner, rigidly to the shaft of the driving engine, and to mount the runner on a shaft journalled in a bearing on the side of the driving part remote from the engine shaft. This known arrangement suffers from the objection that vibration of the engine shaft is transmitted through this bearing to the driven shaft of the coupling; and it has been found that, with an internal combustion engine having a relatively flexible crank-shaft, although the hydraulic coupling damps torsional oscillations, transverse vibrations of the crank-shaft may be transmitted to the shafts or change-speed gearing driven through the coupling to such an extent as to cause objectionable effects at critical speeds.

An object of the present invention is to provide an improved construction which eliminates or greatly reduces this objection.

It is sometimes desirable to provide a friction clutch between a hydraulic coupling and a driven machine; and with such an arrangement in automobiles it is not easy to arrange suitable bearings for the element which includes the runner of the hydraulic coupling and the driving part of the friction clutch.

A further object of the present invention is to provide an improved construction which facilitates the addition of a friction clutch behind the hydraulic coupling.

According to the present invention in one aspect a hydraulic power transmission system of the kind set forth comprises a hydraulic coupling of the kinetic type having a driving part which includes an impeller element and a casing shrouding the back of a runner element, said driving part being rigidly fixed to the shaft of the driving engine, and a driven shaft on which is fixed the runner element and which is adapted to drive the input shaft of the driven machine, said driven shaft being journalled at one end in or on a part of said driven machine and at the other end in said engine shaft or in said driving part adjacent to said engine shaft, and a radial clearance being provided between said driven shaft and the portion of said driving part remote from said engine shaft.

According to the present invention in another aspect, a hydraulic power transmission system of the kind set forth comprises a hydraulic coupling of the kinetic type having a driving part which includes an impeller element and a casing shrouding the back of a runner element, said driving part being rigidly fixed to the shaft of the driving engine, a driven shaft on which is fixed the runner element, and a friction clutch adapted to transmit the drive from the driven shaft to the input shaft of the driven machine, said driven shaft being fixed to a hollow driving element of the friction clutch, which driving element forms an extension of the driven shaft and which is journalled in or on a part of said driven machine, and the other end of the driven shaft being journalled in said engine shaft or in said driving part adjacent to said engine shaft. In this construction it is preferable to provide a radial clearance between the driven shaft and the portion of the driving part remote from the engine shaft, in order to reduce the transmission of transverse vibrations from the engine shaft to the driven machine.

A gland of the diaphragm type is preferably used to prevent leakage of working liquid at the place where said radial clearance is provided.

The end of the driven shaft remote from the engine is preferably journalled directly in the casing of the driven machine and made hollow to accommodate the end of the input shaft of this machine. The driven shaft may, however, be mounted in a hollow input shaft and be supported thereby, preferably in a plane containing an input shaft bearing.

The invention will be further described with reference to the examples shown in the accompanying diagrammatic drawing of parts of motor-car transmission systems.

Figure 1:
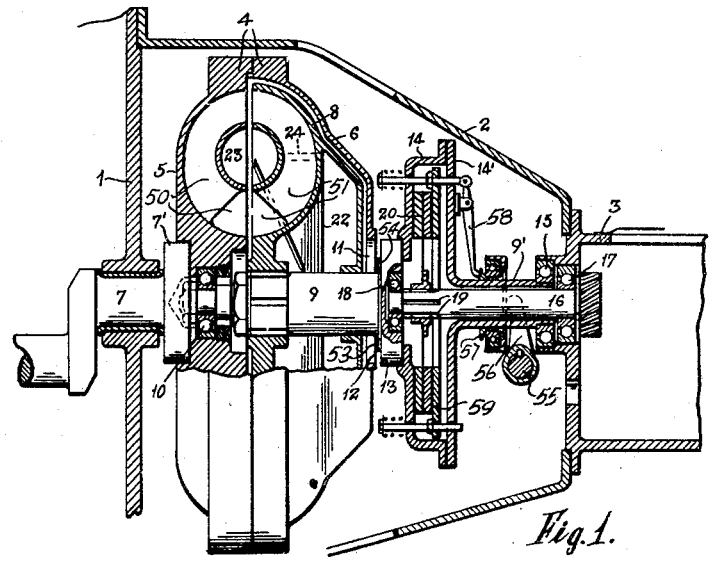
Fig. 1 is a sectional side elevation of part of a transmission system having a hydraulic coupling in series with a friction clutch.

Referring to Fig. 1 an internal combustion engine, part of which is shown at 1, is connected by a bell housing 2 to the casing 3 of a change-speed gear mechanism. The driving part 4 of the hydraulic coupling comprises an impeller 5 provided in known manner with internal vanes 50. The impeller is fixed to a casing member 6. The coupling impeller 5 is attached to a flange 7' on the engine crank-shaft 7, and the coupling runner 8, which is provided in known manner with internal vanes 51, is placed behind the impeller and fixed to a driven shaft 9, the front end of which is carried by a ball bearing 10 adapted to take both thrust and journal loads and mounted in the hub of the impeller 5 immediately adjacent to the flange 7'. The casing member 6 is attached to the periphery of the impeller 5 and shrouds the back of the runner 8, the driven shaft 9 passing through a clearance hole 11 in the centre of this casing. The casing is preferably sealed with respect to the shaft 9 by a diaphragm gland 12 of the kind described in United States Patent No. 2,011,735.

The gland 12 comprises a flexible annular steel diaphragm the periphery of which is secured to the casing member 6 in any suitable manner that will ensure a fluid-tight joint. To the inner edge of the diaphragm is fixed a rubbing ring 53, which may be of hardened steel or bronze. The rear face of this ring is ground or scraped flat to a high degree of accuracy. The elasticity of the diaphragm causes the ring 53 to bear against a similarly trued face of a hardened steel ring 54 which is secured to the face of the flange 13 in any suitable manner that will prevent leakage of fluid between the ring 54 and this flange. A radial clearance exists between the inner edge of the ring 53 and the shaft 9 so that the casing member 6 can be displaced transversely relative to the shaft 9 without overstraining the diaphragm or causing the rings 53 and 54 to move apart.

On the back of the runner 8 is formed an annular reservoir chamber 22, the outer part of which communicates by ducts 24 with an annular space 23 between core guide rings on the impeller and runner, with the object of ensuring automatic regulation of the liquid content of the working circuit, as described in United States Patent No. 1,963,720. Immediately behind the gland the driven shaft is provided with a flange 13 to which is fixed the hollow body 14 of a disc clutch of ordinary construction. A cover plate 14' fixed to the rear of this clutch body is provided with a tubular boss 9' which forms, in effect, a continuation of the coupling driven shaft 9. The rear end of this boss is supported in the gear-box casing 3 by a bearing 15. A gear-box input shaft 16 may be journalled at its rear end within the tubular boss 9' or preferably as shown directly in the gear casing 3 by a bearing 17, while the front end of the input shaft 16 is journalled by a bearing 18 housed in the flange 13 of the driven shaft. The input shaft 16 is drivably connected by splines 19 with the driven element 20 of the friction clutch. Since the driven shaft as a whole, consisting of the driven shaft proper 9, the clutch body 14 and the cover plate 14' with its tubular boss 9' rigid therewith and forming an extension thereof, is journalled at one end in the coupling driving part immediately adjacent to the engine crank-shaft and at the other end in the gear casing 3, and is not supported by the overhung portion 6 of the coupling driving part, it is largely insulated from vibrations transmitted from the crank-shaft to the coupling. Furthermore, the crank-shaft is relieved of bending moment due to the runner 8 and driven shaft.

When the engine shaft 7 is revolving and the hydraulic coupling is therefore incapable of completely interrupting the transmission between the engine and the gear shaft 16, the transmission may be interrupted by the friction clutch, for example to facilitate changing of the gear engaged in the gear box 3. The clutch is disengaged by mechanism of usual design comprising a spring-loaded presser plate 59 connected with radial levers, one of which is shown at 58 and which cooperate with a thrust collar 57 engaged by a yoke 56 keyed to a control shaft 55.

When the shaft 55 is rocked in an anti-clockwise direction (as viewed in Fig. 1), the yoke 56 causes the thrust collar 57 to move to the left and thereby rock the radial levers 58 about their pivots on the cover plate 14'. The outer ends of these levers are linked to the presser plate 59 by withdrawal pins, so that this rocking of the levers 58 causes the presser plate to move to the right, permitting the driven plate 20 and the shaft 16 to rotate independently of the clutch body 14. When the control shaft 55 is permitted to rock in the clockwise direction, the clutch springs force the pressure plate 59 to the left and against the driven plate 20 which is thereby re-engaged with the clutch body 14.

In the construction shown in Fig. 2, in which no friction clutch is provided, the driving part 4 of the coupling is arranged as described with reference to the example shown in Fig. 1. On the back of the runner 8a is formed an annular reservoir chamber 22a, the rear wall 21 of which is fixed to a hollow driven shaft 9a. The outer part of the chamber 22a communicates by ducts 24 with the annular core space 23. An annular ring valve 25 is normally accommodated in this reservoir chamber and is carried by a spider 26 slidable on the driven shaft 9a. This valve can be slid into the working circuit, through an annular slot 27 in the runner, to throttle the circulation, the vanes 51a being slotted as at 52 to permit movement of the valve.

The front end of the coupling driven shaft 9a is in this example journalled in the flange 7'a of the crank-shaft 7 by a journal and thrust bearing 10a, and the rear end is journalled at 15a in the front end of a fixed hollow boss 28 extending towards the engine from the gear casing 3a. The gear-box input shaft 16a is journalled at its rear end in the gear casing by a bearing 17a and its front end is splined at 29 to engage with the rear end of the bore of the driven shaft 9a. The ring valve 25 is actuated by means of a bolt 30 slidable in the bore of the driven shaft, and provided with cross pins 31, 32 at each end projecting through slots 33, 34 in this shaft. The cross pin 31 is engaged with the ring valve spider 26, while the cross pin 32 is engaged with a grooved actuating collar 35 slidable on the driven shaft by the usual control yoke not shown. The driven shaft is preferably provided with a brake which may be a rocking brake of the type described in United States Patent No. 1,978,172 but which in the present example is shown as a simple clutch stop brake 36, 37 so arranged that it is engaged when the ring valve is in its throttling position. In this arrangement also, since there is a radial clearance 11 between the rotatable casing 6a and the driven shaft 9a, there is substantially no risk of the transmission of transverse vibration from the crank-shaft to the change-speed gearing. A diaphragm gland 12 is provided to seal the clearance space 11, this gland being similar to that described with reference to Fig. 1.

The shaft 16a can be retarded or arrested while the engine is running by moving the actuating collar 35 to the left, by means of a suitable member (not shown) engaged in the groove therein. This has the effect of simultaneously causing the rotating brake drum 36 to engage the fixed brake drum 37 and inserting the ring valve 25 into the working circuit of the hydraulic coupling whereby the torque transmitted by this coupling is reduced and the work to be done by the brake 36, 37 is correspondingly lightened.

Figure 2:
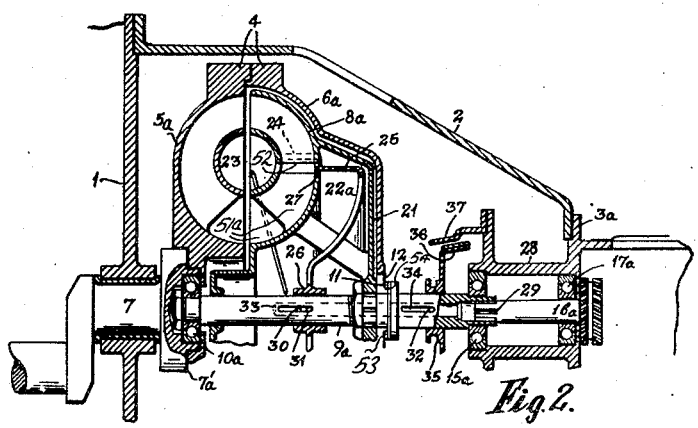
Fig. 2 is a sectional side elevation of an alternative arrangement provided with a hydraulic coupling having a ring valve.

When the brake is disengaged and the ring valve is consequently in the inoperative position, as shown in Fig. 2, and the coupling is rotating with a relatively low slip, the liquid in the working circuit circulates in the form of a liquid vortex about the core space 23 where a low hydraulic pressure exists; consequently any liquid in the reservoir chamber 22a is forced by the action of centrifugal force through the ducts 24 into the working circuit. When, however, the brake is engaged and the ring valve is closed, the speed of the driven part of the hydraulic coupling falls and the vortex circulation is arrested. As a consequence, the centrifugal force acting on liquid in the reservoir 22a decreases and owing to the breakdown of the vortex circulation the hydraulic pressure within the core space 23 rises, so that some liquid is forced out of the circuit through the ducts 24 into the reservoir. The torque transmitted by the coupling under these circumstances is reduced on account of both the action of the ring valve and the reduction in liquid content of the working circuit.

Figure 3:
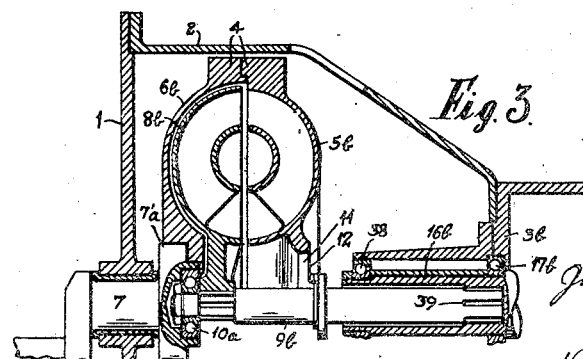
Fig. 3 is a sectional side elevation of a further alternative construction.

In the arrangement shown in Fig. 3, the casing member 6b of the coupling driving part 4 is fixed to the flange 7'a of the crank shaft 7, and the impeller 5b is behind the runner 8b. A hollow input shaft 16b of the gearing is journalled at 17b in the gear casing 3b, while its front end is supported by a bearing 38 housed in an extension of the gear casing. The rear end of the driven shaft 9b is splined at 39 where it is supported by and drivably engaged with the input shaft 16b.

I claim:

1. A hydraulic power transmission system comprising a driving engine having a driving shaft, a driven machine having an input shaft, a hydraulic coupling of the kinetic type having a driving part which includes an impeller element and a casing secured thereto, said driving part being rigidly fixed to said driving shaft, and a runner element juxtaposed to said impeller element and having its back shrouded by said casing, a rigid driven shaft on which said runner element is fixed and which serves to drive said input shaft, a bearing mounted in the neighborhood of the end of said driving shaft to which said driving part is attached and supporting one end of said rigid driven shaft from said driving shaft, and a bearing mounted on said driven machine and supporting the other end of said driven shaft, said bearings cooperating to resist radial displacement of said runner element, and a radial clearance being provided between said driven shaft and the portion of said driving part remote from said engine shaft.

2. A hydraulic power transmission system comprising a driving member including an engine crank-shaft and a hollow liquid-tight shell rigidly fixed to an end thereof and provided with internal vanes, the part of said shell remote from said crank-shaft having a central aperture, a vaned runner member accommodated within said shell, a rigid driven shaft on which said runner is mounted and which passes through said aperture with a radial clearance, a bearing mounted in said driving member in the neighborhood of said end of said crank-shaft and supporting one end of said driven shaft, a driven machine having an input shaft, a bearing mounted on said driven machine and supporting the other end of said driven shaft, means for constraining said driven and input shafts to rotate in unison, and a gland sealing said aperture and capable of accommodating relative transverse motion of said shell and said driven shaft due to flexibility of said crank-shaft.

3. A hydraulic power transmission system comprising an engine shaft, a hydraulic coupling of the kinetic type having a driving part which includes an impeller element and a casing secured thereto, said driving part being rigidly fixed to an end of said engine shaft, and a runner element juxtaposed to said impeller element and having its back shrouded by said casing, a rigid driven shaft on which said runner element is fixed, a bearing supporting said driven shaft from said engine shaft and located in the neighborhood of said end of said engine shaft, a driven machine having an input shaft, a friction clutch having a hollow driving part fixed to and forming a continuation of said driven shaft, and surrounding said input shaft, and a driven part connected for rotation with said input shaft, a bearing mounted on said driven machine and supporting said hollow clutch driving part and a control member for actuating said friction clutch.

4. A hydraulic power transmission system comprising an engine shaft, a hydraulic coupling of the kinetic type having a driving part which includes an impeller element and a casing secured thereto, and a runner element, said driving part being rigidly fixed to an end of said engine shaft and having a central aperture in the end thereof remote from said engine shaft, and said runner element being juxtaposed to said impeller element and shrouded by said casing, a rigid driven shaft to which said runner element is fixed and which passes with radial clearance through said aperture, a bearing supporting said driven shaft from said engine shaft and located in the neighborhood of said end of said engine shaft, a driven machine having an input shaft, a friction clutch having a hollow driving part fixed to and forming a continuation of said driven shaft and surrounding said input shaft, and a driven part connected for rotation with said input shaft, a bearing mounted on said driven machine and supporting said hollow clutch driving part, and a control member for actuating said friction clutch.

5. A hydraulic power transmission system comprising an engine shaft, a hydraulic coupling of the kinetic type having a driving part which includes an impeller element and a casing secured thereto, and a runner element, said driving part being rigidly fixed to an end of said engine shaft and having a central aperture in the end thereof remote from said engine shaft, and said runner element being juxtaposed to said impeller element and shrouded by said casing, a rigid driven shaft to which said runner element is fixed, and which passes with radial clearance through said aperture, a bearing supporting said driven shaft from said engine shaft and located in the neighborhood of said end of said engine shaft, a driven machine having an input shaft, a friction clutch having a hollow driving part fixed to and forming a continuation of said driven shaft and surrounding said input shaft, and a driven part connected for rotation with said input shaft, a bearing mounted on said driven machine and supporting said hollow clutch driving part, a control member for actuating said friction clutch, and a gland for sealing said aperture and capable of accommodating relative transverse motion of said shell and said driven shaft.

6. A hydraulic power transmission system comprising an engine shaft, a hydraulic coupling of the kinetic type having a driving part which includes an impeller element and a casing secured thereto, and a runner element, said driving part being rigidly fixed to an end of said engine shaft and having a central aperture in the end thereof remote from said engine shaft, and said runner element being juxtaposed to said impeller element and shrouded by said casing, a rigid driven shaft to which said runner element is fixed and which passes with radial clearance through said aperture, a bearing supporting said driven shaft from said engine shaft and located in the neighborhood of said end of said engine shaft, a driven machine having an input shaft and a fixed casing, a bearing supported from said fixed casing and supporting the other end of said driven shaft, and means for constraining said driven and input shafts to rotate in unison.

7. A hydraulic power transmission system comprising an engine shaft, a hydraulic coupling of the kinetic type having a driving part which includes an impeller element and a casing secured thereto, and a runner element, said driving part being rigidly fixed to an end of said engine shaft and having a central aperture in the end thereof remote from said engine shaft, and said runner element being juxtaposed to said impeller element and shrouded by said casing, a rigid driven shaft to which said runner element is fixed, said driven shaft being provided with an axial bore in the end thereof remote from said engine shaft, and said driven shaft passing with radial clearance through said aperture, a bearing supporting said driven shaft from said engine shaft and located in the neighborhood of said end of said engine shaft, a driven machine having an input shaft at least in part accommodated within said axial bore, and a bearing mounted on said driven machine and supporting said driven shaft.

8. A hydraulic power transmission system comprising an engine shaft, a hydraulic coupling of the kinetic type having a driving part which includes an impeller element and a casing secured thereto, and a runner element, said driving part being rigidly fixed to an end of said engine shaft and having a central aperture in the end thereof remote from said engine shaft, and said runner element being juxtaposed to said impeller element and shrouded by said casing, a rigid driven shaft to which said runner element is fixed, which is provided with an axial bore, and which passes with radial clearance through said aperture, a bearing supporting said driven shaft from said engine shaft and located in the neighborhood of said end of said engine shaft, a driven machine having an input shaft, a bearing mounted on said driven machine and supporting said driven shaft, a baffle element movable into and out of the working circuit of said hydraulic coupling, a bolt slidable in said axial bore and operatively connected with said baffle element, and a collar slidably mounted on said driven shaft between said coupling driving part and said driven machine and means for transmitting sliding motion from said collar to said bolt.

9. A hydraulic power transmission system comprising an engine shaft, a hydraulic coupling of the kinetic type having a driving part which includes an impeller element and a casing secured thereto, and a runner element, said driving part being rigidly fixed to an end of said engine shaft and having a central aperture in the end thereof remote from said engine shaft, and said runner element being juxtaposed to said impeller element and shrouded by said casing, a rigid driven shaft to which said runner element is fixed and which passes with radial clearance through said aperture, a bearing supporting said driven shaft from said engine shaft and located in the neighborhood of said end of said engine shaft and a driven machine having an input shaft provided with an axial bore accommodating the end of said driven shaft remote from said engine shaft, said input shaft supporting and being coupled for rotation with said driven shaft.

10. A hydraulic power transmission system comprising an engine having a crank-shaft, a driven machine having an input shaft spaced from and aligned with said crank-shaft, a hydraulic coupling of the kinetic type having a hollow driving part provided with internal vanes, fixed to an end of said crank-shaft and provided with a central aperture in the end thereof remote from said crank-shaft, a rigid driven shaft aligned with said crankshaft and passing with radial clearance through said aperture, a runner element accommodated within said coupling driving part and fixedly mounted on said driven shaft, a bearing supporting one end of said driven shaft from said crank-shaft and located in the neighborhood of said end of said crank-shaft, the other end of said driven shaft being supported by said driven machine, means for constraining said driven and input shafts to rotate in unison, and a diaphragm gland for sealing said aperture.

11. A hydraulic power transmission system comprising an engine having a crank-shaft provided with a flange on one end thereof, a driven machine having an input shaft spaced from and aligned with said flange, a hydraulic coupling having a driving part in the form of a hollow shell having internal vanes and rigidly fixed to said flange, the end of said shell remote from said flange having a central aperture, a vaned runner element accommodated within said shell, a rigid driven shaft on which said runner element is mounted and which passes through said aperture with radial clearance, a bearing mounted rigid with and adjacent to said flange and supporting one end of said driven shaft, a bearing on said driven machine supporting the other end of said driven shaft, and coupling means for constraining said driven and input shafts to rotate in unison.

12. A hydraulic power transmission system comprising an engine having a crank-shaft, a driven machine having an input shaft spaced from and aligned with said crank-shaft, a hydraulic coupling of the kinetic type having a hollow driving part provided with internal vanes, fixed to one end of said crank shaft and provided with a central aperture in the end thereof remote from said crank-shaft, a rigid driven shaft aligned with said crank-shaft and passing with radial clearance through said aperture, a runner element accommodated within said coupling driving part and fixedly mounted on said driven shaft, a bearing mounted in said coupling driving part adjacent to said end of said crank shaft and supporting one end of said driven shaft, a bearing on said driven machine supporting the other end of said driven shaft, and coupling means for constraining said driven and input shafts to rotate in unison.

13. A hydraulic power transmission system comprising an engine shaft, a hydraulic coupling of the kinetic type having a driving part which includes an impeller element and a casing secured thereto, said driving part being rigidly fixed to an end of said engine shaft, and a runner element juxtaposed to said impeller element and having its back shrouded by said casing, a rigid driven shaft on which said runner element is fixed, a bearing supporting said driven shaft from said engine shaft and located in the neighborhood of said end of said engine shaft, a driven machine having an input shaft, a friction clutch having a hollow driving part fixed to and forming a continuation of said driven shaft and surrounding said input shaft, and a driven part connected for rotation with said input shaft, a bearing mounted on said driven machine and supporting said hollow clutch driving part, a bearing supporting an end of said input shaft from said driven shaft and located in the neighborhood of the junction between said driven shaft and said hollow clutch driving part, and a control member for actuating said friction clutch.

14. A hydraulic power transmission system comprising an engine shaft, a hydraulic coupling of the kinetic type having a driving part which includes an impeller element and a casing secured thereto, and a runner element, said driving part being rigidly fixed to an end of said engine shaft and having a central aperture in the end thereof remote from said engine shaft, and said runner element being juxtaposed to said impeller element and shrouded by said casing, a rigid driven shaft to which said runner element is fixed and which passes with radial clearance through said aperture, a bearing supporting said driven shaft from said engine shaft and located in the neighborhood of said end of said engine shaft, a driven machine having an input shaft, a friction clutch having a hollow driving part fixed to and forming a continuation of said driven shaft and surrounding said input shaft, and a driven part connected for rotation with said input shaft, a bearing mounted on said driven machine and supporting said hollow clutch driving part, a bearing supporting an end of said input shaft from said driven shaft and located in the neighborhood of the junction between said driven shaft and said hollow clutch driving part, and a control member for actuating said friction clutch.

15. A hydraulic power transmission system comprising an engine shaft, a hydraulic coupling of the kinetic type having a driving part which includes an impeller element and a casing fixed thereto, and a runner element, said driving part being rigidly attached to an end of said engine shaft and having a central aperture in the end thereof remote from said engine shaft, and said runner element being juxtaposed to said impeller element and shrouded by said casing, a driven machine having an input shaft aligned with but spaced from said engine shaft, a rigid driven shaft to which said runner element is fixed, a relatively heavy transmission element mounted on said driven shaft and disposed behind said hydraulic coupling and in front of said driven machine, a bearing supporting the front end of said driven shaft from said engine shaft and located in the neighborhood of said end of said engine shaft, and a bearing mounted on said driven machine and supporting the other end of said driven shaft, said driven shaft passing with radial clearance through said aperture so as to reduce the transmission of transverse vibrations from said engine shaft to said transmission element.

JOHANN NIKOLAUS KIEP.